(12) United States Patent
Hongo et al.

(10) Patent No.: US 7,769,058 B2
(45) Date of Patent: Aug. 3, 2010

(54) OPTICAL FIBER LASER

(75) Inventors: Akihito Hongo, Hitachi (JP); Kazumasa Ohsono, Hitachi (JP); Bing Yao, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 0 days.

(21) Appl. No.: 11/702,190

(22) Filed: Feb. 5, 2007

(65) Prior Publication Data

US 2007/0189340 A1  Aug. 16, 2007

(30) Foreign Application Priority Data

Feb. 10, 2006  (JP) ............................ 2006-033717

(51) Int. Cl.
*H01S 3/30* (2006.01)
(52) U.S. Cl. ............................ 372/6; 385/36
(58) Field of Classification Search ............ 372/6; 385/36
See application file for complete search history.

(56) References Cited

U.S. PATENT DOCUMENTS

| 4,877,301 A | * | 10/1989 | Yokomori et al. ............. 385/37 |
| 5,999,673 A | | 12/1999 | Valentin et al. |
| 6,683,892 B1 | * | 1/2004 | Yamaura et al. ............... 372/6 |
| 2002/0172236 A1 | * | 11/2002 | Sekiguchi et al. .............. 372/6 |
| 2005/0281508 A1 | * | 12/2005 | Krupkin et al. ............... 385/36 |
| 2006/0002434 A1 | * | 1/2006 | Nakano et al. ................. 372/6 |

* cited by examiner

*Primary Examiner*—Tod T Van Roy
(74) *Attorney, Agent, or Firm*—Brundidge & Stanger, P.C.

(57) ABSTRACT

To provide a low-cost, high reliability and high-powered operation enabled optical fiber laser, in the optical fiber laser for oscillating a laser light by introducing an excitation light for exciting the rare earth elements into the optical fiber doped partially by the rare earth elements, the optical fiber is wrapped around the base member, and one part of the outer circumferential area of the wrapped optical fiber is processed in order to form a flat surface, and one face of the prism is made contacted to the flat surface, and the excitation light is introduced to another surface of the prism.

15 Claims, 4 Drawing Sheets

OPTICAL FIBER LASER

BACKGROUND OF THE INVENTION

The present invention relates to an optical fiber laser that can be realized in lower cost, provided with higher reliability and enabled to be operated in high power.

Development of higher powered and lower cost light sources are required for the application in laser material processing and medical equipment. In order to meet this requirement, optical fiber lasers are enabling technology for generating highly efficient single-mode laser lights easily.

A conventional optical fiber laser uses such a double-clad type optical fiber 40 as shown in FIG. 4. The core region 41 of the double-clad type optical fiber 40 is doped by rare earth metals such as Nd, Yb, Er and Th. The clad region has a double structure in which an inner cladding region 42 having a refractive index lower than that of the core region 41 and an outer cladding region 43 having a refractive index lower than that of the inner cladding region 42 are included. The excitation light 44 propagates inside the inner clad region 42 in a multi-mode, and attenuates gradually as being absorbed in the center core region 41.

In case of high-powered optical fiber laser, the key technology is to introduce the excitation light into the inner clad region 42.

FIGS. 5A to 5C show major excitation methods in the conventional optical fiber lasers.

The method shown in FIG. 5A is called an end-face excitation method, in which the excitation light 53 generated by the semiconductor laser 52 oscillated in a multi-mode is introduced directly into the end-face of the optical fiber. There is another method for introducing the excitation light into the end-face of the optical fiber in which the excitation light generated by the semiconductor laser oscillated in a multi-mode is coupled to the multi-mode optical fiber at first, and then the coupled lights are bundled and focused, and finally coupled to the end-face of the inner clad region of the double-clad type optical fiber.

The method shown in FIG. 5B is called a V-groove method, in which the excitation lights 53 are focused into the V-groove 56 formed at the side face of the double-clad type optical fiber 51, and then the excitation lights are introduced into the inner clad region by way of reflection at the boundary surface.

The method shown in FIG. 5C is called a parallel-side excitation method, in which the multi-mode optical fiber 55 used for introducing the excitation lights is fused and connected onto the side face of the double-clad type optical fiber 51 (see U.S. Pat. No. 5,999,673). In this method, it will be appreciated that the intensity of the excitation lights can be increased by increasing the number of introducing ports, and that, the fluctuation of the laser power can be suppressed by using a plurality of semiconductor lasers, even if any of the semiconductor lasers may be failed.

FIG. 6 shows a general configuration of the optical fiber laser using the parallel-side excitation method. The excitation lights provided by the individual the semiconductor lasers 62, each configured in a single-emission structure, are introduced by the multi-mode optical fiber into the double-clad type optical fiber 61 in which the core region is doped by rare earth elements. The excitation light is introduced into the inner clad region of the double-clad type optical fiber 61 through the excitation light combiner 63 formed by fusing the double-clad type optical fiber 61 and the multi-mode optical fiber at the side-to-side position. In order to attain a high power, a plurality of semiconductor lasers 62 are connected as shown in FIG. 6. The fiber grating 64a that transmits the wavelength components corresponding to the wavelength of the excitation light and has a higher reflectance for the wavelength component corresponding to the wavelength of the oscillated light is formed at one end of the double-clad type optical fiber 61 (at the side into which the excitation light is introduced). In contrast, another fiber grating 64b reflecting partially the oscillated light is also formed at the opposite side to the place where the excitation light is introduced. Those two fiber gratings 64a and 64b operate as a total reflecting mirror and an output mirror for the laser resonator, respectively, and then, the laser oscillation light 65 is output. In order to provide a higher power, it is possible to introduce the similar excitation light at the opposite side where the laser light is emitted.

SUMMARY OF THE INVENTION

In the end-face excitation method shown in FIG. 5a, in which the excitation light is introduced directly into the side face of the double-clad type optical fiber 51, the light introduction aperture is determined by the diameter of the inner clad region, and is at most several hundreds micro meters. Therefore, in order to attain high power, there occurs a problem to be solved for searching how to introduce the high power excitation light into the narrow end face of the inner clad. Even in the method in which the semiconductor laser light provided in single-emission is coupled to the multi-mode optical fiber at first, and then this coupled laser light is bundled and focused so as to be introduced to the end face of the inner clad region, the number of semiconductor excitation lasers to be bundled is limited and hence the large number of semiconductor excitation lasers can not be expected. As it is required to make the output of the individual semiconductor excitation laser large enough to provide a high power, it may result in the shorter lifetime and high costs of semiconductor excitation lasers. In attempting to oscillate the laser in a high power, the power density at the light propagation regions becomes very large. The power density of the excitation light is very high near the introduction end part of the excitation light, and there may be such a risk that the optical fiber is damaged. Though the end-face excitation method provides a high conversion efficiency for the laser oscillation light, the overall power of the excitation light to be introduced is limited. In addition, a single-mode failure in the semiconductor excitation laser may affect the power fluctuation for the overall optical fiber laser.

In the V-groove method shown in FIG. 5B, a complex process is required for forming a cuneal-shaped V-groove at the side face of the optical fiber and this process reduces the mechanical strength of the optical fiber extremely.

In the parallel-side excitation method shown in FIG. 5C, as the overall amount of excitation light can be increased by increasing the number of introduction ports, the amount of excitation light can be increased. However, this method requires the process in which individual multi-mode optical fiber for introducing the semiconductor laser light is fusion spliced one-by-one onto the side face of the double-clad type optical fiber, this fusion splicing includes many pieces of precise works and the structure of fusion splicing points becomes complex. The semiconductor laser to be used has a single emission structure which is easily coupled to the multi-mode optical fiber, and such a low-cost and overall high optical powered semiconductor laser as having a bar and stuck structure is not suitable for this excitation method.

An object of the present invention is to provide a low-cost, high reliability and high-powered operation enabled optical fiber laser in order to solve the above problems.

In order to attain the above object, the present invention is characterized by an optical fiber laser for oscillating a laser light by introducing an excitation light for exciting a rare earth element, comprising: an optical fiber doped partially by the rare earth element and wrapped around a base member, one part of an outer circumferential area of the wrapped optical fiber being processed in order to form a flat surface; and a prism, whose one face is made contacted to the flat surface; wherein the excitation light is introduced into said optical fiber through another surface of said prism.

It is allowed that one face of the prism is contacted to one face of the flat surface, and a metal film for reflecting the excitation light is coated on the exposed flat surface without contacting to the prism.

It is allowed that the optical fiber is composed of a solid core region, inner and outer cladding regions concentric to the solid core region, the rare earth elements are doped to the solid core region, the refractive index of the inner cladding region is made smaller than that of the solid core region and larger than that of the outer cladding region, and the flat surface is formed so as to reach the inner cladding region.

It is allowed that the optical fiber is composed of a hollow core region, inner and outer cladding regions concentric to the hollow core region, plural holes are formed in the inner cladding region in order to form a photonic band gap in the oscillation light wavelength band, the rare earth elements are doped to the solid part of the inner cladding region, the refractive index of the outer cladding region is made smaller than that of the solid part of the inner cladding region, and the flat surface is formed so as to reach the inner cladding region.

It is allowed that a mirror surface is formed at the outer circumferential area of the base member.

It is allowed that a groove for supporting the optical fiber is formed at the outer circumferential area of the base member.

It is allowed that the wrapped optical fiber is fixed by transparent adhesive material having a refractive index smaller than that of the outer cladding region.

It is allowed that the semiconductor excitation light source is configured in a bar structure in which the light emitting device part is arranged in a linear array or configured in a stack structure in which the linear arrays are piled.

It is allowed that the outer surface of the base member is formed as a smooth, flat surface and a curved surface.

It is allowed that the excitation light is introduced into a couple of surfaces of the prism respectively, in which those surfaces does not contact to the flat surface of the circumferential area of the optical fiber.

According to the present invention, a low-cost, high reliability and high-powered operation enabled optical fiber laser can be realized.

DETAILED DESCRIPTION OF THE PREFERRED EMBODIMENTS

Now, referring to the attached drawings, one embodiment of the present invention will be described in detail.

Figure 1A:
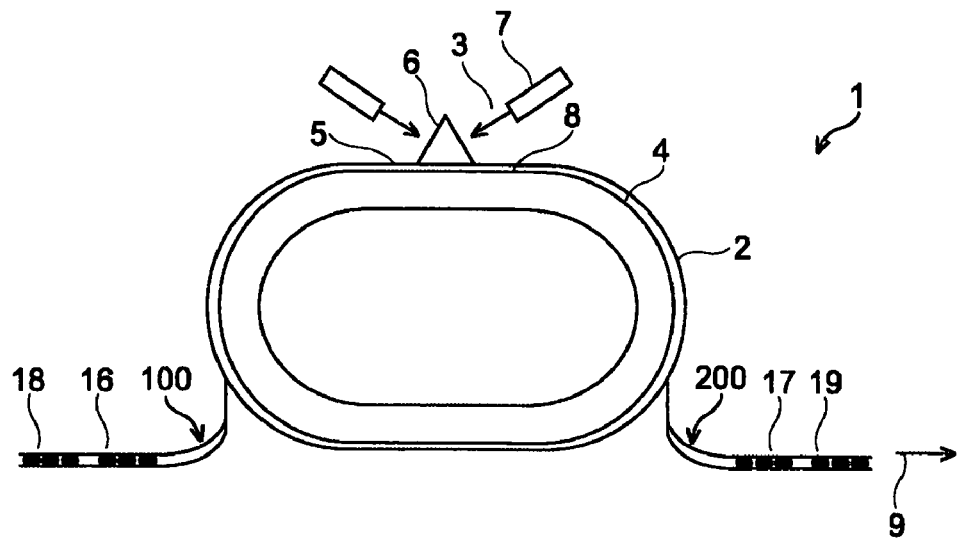
FIG. 1A is a structural diagram of the optical fiber laser illustrating one embodiment of the present invention shown as a cross section view projected onto the plane orthogonal to the primary axis of the base member.
Figure 1B:
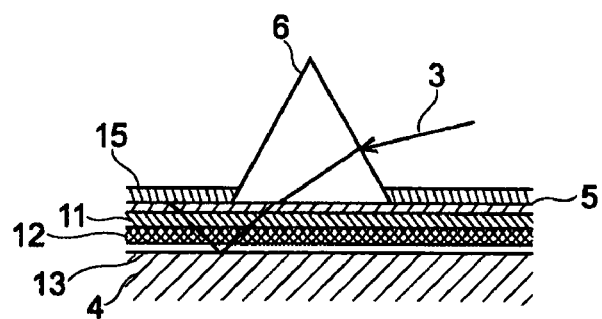
FIG. 1B is a magnified partial picture of the cross section view shown by FIG. 1A.
Figure 1C:
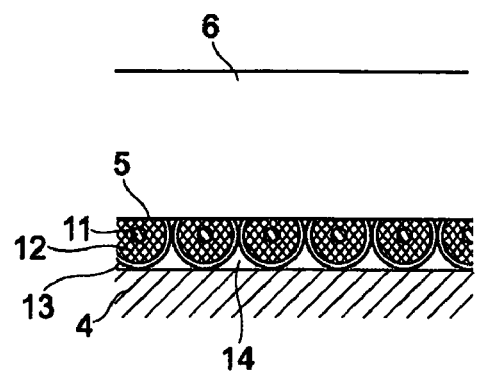
FIG. 1C is a magnified partial picture of the cross section view of the part projected onto the plane parallel to the primary axis of the base member.

Referring to FIGS. 1A, 1B and 1C, the optical fiber laser 1 according to the present invention is characterized by the optical fiber laser 1 for oscillating a laser light 9 by introducing an excitation light 3 for exciting the rare earth elements into the optical fiber 2 doped partially by the rare earth elements, in which the optical fiber 2 is wrapped around the base member 4, and one part of the outer circumferential area of the wrapped optical fiber 2 is processed in order to form a flat surface 5, and one face of the prism 6 is made contacted to the flat surface 5, and the excitation light source 7 is directed to another surface of the prism 6.

The cross-sectional shape of the base member 4 projected onto the vertical plane to the longitudinal axis of the base member 4 is identical at any place along the longitudinal direction of the base member 4. Though the base member 4 may be formed as a solid cylinder, by means of forming the base member 4 as a hollow cylinder and providing a coolant path at the hollow base member for flowing the coolant such as water, the temperature rise in the optical fiber due to the high-power excitation light introduction can be avoided.

Though the base member 4 can be formed in a cylindrical shape, the base member 4 is formed in a long cylinder in this embodiment in which the cross-section shape of the base member 4 projected onto the vertical plane to the longitudinal axis of the base member 4 may be elliptical so that a flat surface 8 can be established at the outer circumferential area of the base member 4.

The reflectance at the outer circumferential area of the base member 4 is made high by forming a mirror surface in order to give back the excitation light 3 transmitted through the optical fiber 2 into the optical fiber 2 again. Copper is used for the material used for the base member 4 because copper provides a higher reflectance at the wavelength band of the excitation light 3 and a higher thermal conductivity. It is allowed that gold plating is applied to the base member 4 made of copper.

Figure 4:
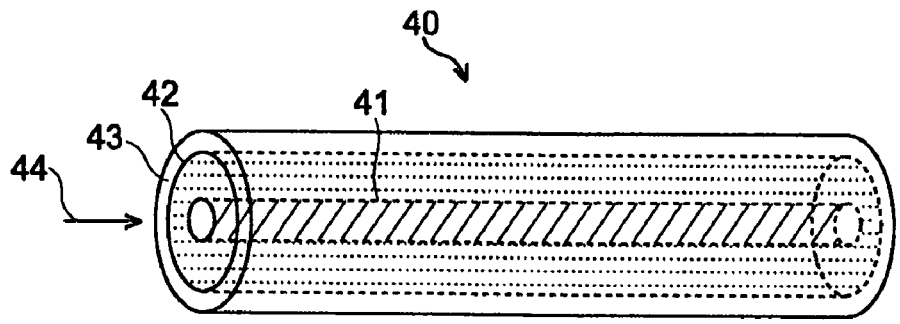
FIG. 4 is a schematic view of the double-clad type optical fiber used in one embodiment of the present invention.
Figure 5A:
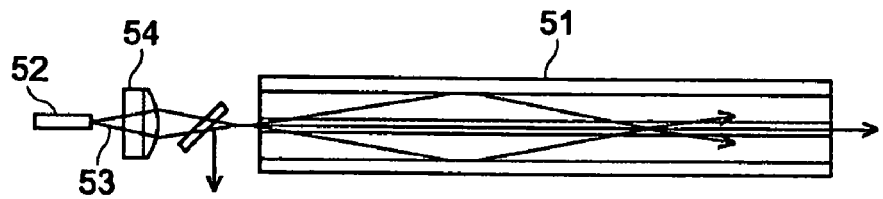
FIG. 5A is a structural diagram of the excitation method for the optical fiber laser in the prior art.
Figure 5B:
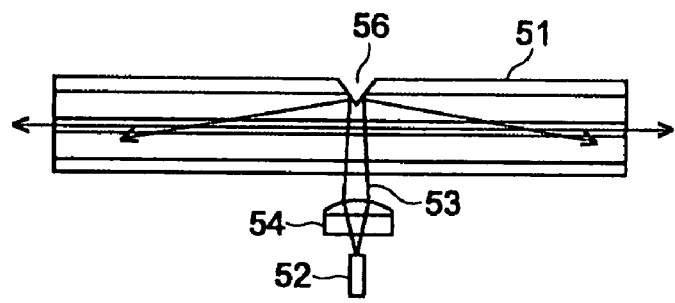
FIG. 5B is another structural diagram of the excitation method for the optical fiber laser in the prior art.
Figure 5C:
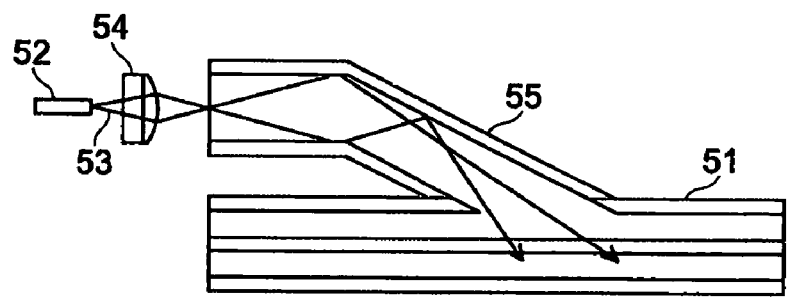
FIG. 5C is another structural diagram of the excitation method for the optical fiber laser in the prior art.
Figure 6:
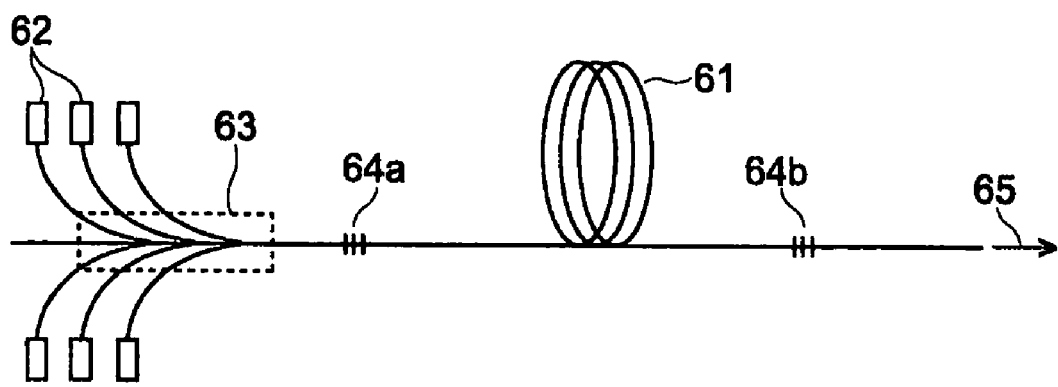
FIG. 6 is a structural diagram of the optical fiber laser in the prior art.

The optical fiber 2 is partially doped by rare earth metals such as Nd, Yb, Er and Th. In this embodiment, the optical fiber 2 is a double-clad type optical fiber in which its cladding region has a two-layered structure as shown by FIG. 4. Concretely, the inner cladding region 12 is formed around the solid core region 11 doped by rare earth metals, and the outer cladding region 13 is formed outside the inner cladding region 12 in the optical fiber 2.

One optical fiber 2 is wrapped spirally so that a (n-1)th turn may contacts nth turn (Here, n is an integer larger than 2). This configuration is called parallel arrangement. The optical fiber 2 wrapped like this may form multilayer structure. However, in this embodiment, single-layer structure is used.

As the optical fiber 2 is wrapped at the outer circumferential area of the base member 4, the cross-section shape defined by the outer circumferential area of the wrapped optical fiber 2 is larger by the diameter of the optical fiber than the cross-section shape of the base member 4 itself. Therefore, it is proved that the outer circumferential shape defined by the optical fiber 2 wrapped at the flat surface 8 of the base member 4 does not have a uniform curvature with respect to the center axis of the base member 4 but has alternating convex and concave surfaces owing to the parallel arrangement of the optical fibers. The convex and concave surfaces may be flattened mechanically for forming the flat surface 5. The flat surface 5 is almost parallel to the flat surface 8.

The flat surface 5 of the optical fiber 2 is formed in order to make the excitation light 3 from the prism 6 inject efficiently. By finishing the flat surface 5 so as to reach the inner cladding region 12, it will be appreciated that the excitation light 3 from the prism 6 can be injected efficiently into the inner cladding region 12.

The wrapped optical fiber 2 is fixed at the base member 4 by filling the transparent adhesive material 14 having a refractive index lower than that of the outer cladding region 13 into the gap between the outer circumferential area of the base member 4 and the optical fiber 2.

The prism 6 has a well-known structure and three surfaces. The prism 6 is arranged at the outer circumferential area of the optical fiber 2 so that one of three surfaces may contact firmly to the flat surface 5. In this embodiment, the prism 6 is arranged so that the surface of the prism 6 which does not contact to the flat surface 5 may be arranged in parallel to the axis of the base member 4. In this arrangement, the ridgeline of the prism 6 is orthogonal to the axis of the optical fiber 2 arranged in parallel, and thus, the prism 6 covers plural optical fibers 2.

The size of the flat surface 5 is formed so as to be larger than the surface of the prism 6 in order to establish a firm contact between the flat surface 5 and the prism 6. Therefore, there is a part on the flat surface 5 that cannot be covered by one surface of the prism 6. This part may be covered with a metal film 15 reflecting the excitation light. Gold is preferably used for the material used for the metal film 15 because gold has a large reflectance at the wavelength band of the excitation light 3 and gold is chemically stable. The metal film 15 is provided in order to protect the light emission outside from the optical fiber 2, give back the excitation light to the optical fiber 2 and increase the absorption effect for the excitation light at the core region 11.

The excitation light source 7 is composed of a semiconductor laser. It is allowed to use a bar-structured semiconductor laser in which the light emitting device parts are arranged in one-dimensional linear array, or use a stack-structured semiconductor laser in which the one-dimensional linear array of semiconductor laser is piled in two-dimensional arrays.

The excitation light source 7 is directed to the prism 6 at a designated angle so that the excitation light 3 injected into the prism 6 may be irradiated from the surface contacting to the flat surface 5 of the optical fiber 2.

It is allowed that the excitation light source 7 may be arranged so that the excitation light 3 injected into the prism 6 may be irradiated from the surface of the prism contacting to the flat surface 5 of the optical fiber 2.

In this embodiment, Yb is doped at the core region 11 of the optical fiber 2. Glass containing Yb has an absorption spectrum at the wavelength band approximately between 900 nm and 1000 nm, and has a couple of large absorption peaks at 915 nm and 976 nm. Thus, the center wavelength of the excitation light 3 is determined to be 976 nm.

As a resonator structure is required to be formed in order to establish a laser oscillation, in this embodiment, another optical fiber (without symbol number), in which a fiber grating 16 having a transmission rejection ratio of 20 dB or larger at the wavelength band of the laser oscillation is formed, is fused onto one end of the optical fiber 2. Yet another optical fiber (without symbol number), in which a fiber grating 17 having a transmission rejection ratio of 10 dB or smaller is formed as an output mirror, is used onto the other end of the optical fiber 2. Bragg wavelength of the individual fiber gratings 16 and 17 is determined to be 1080 nm that is equivalent to the wavelength corresponding to the maximum fluorescence intensity of Yb doped into the optical fiber 2.

Now, referring to FIGS. 1A, 1B and 1C, the operation of the optical fiber laser 1 is described below.

The excitation light 3 injected from the excitation light source 7 into the prism 6 is ejected out from the surface contacting to the flat surface 5 and injected into the side face of the optical fiber 2. The excitation light 3 is absorbed in the core region 11 in which rare earth metals are doped. The component of the excitation light 3 which is not absorbed but transmitted through the optical fiber 2 is reflected at the outer circumferential area of the base member 4, and injected back to the optical fiber 2. At this point, the excitation light 3 is absorbed, and then, the metal film 15 reflects the component of the excitation light 3 which is not absorbed but transmitted through the optical fiber 2. As the excitation light 3 is injected repetitively into the optical fiber 2, the excitation light 3 is absorbed efficiently. In addition, a part of the excitation light 3 is absorbed as the excitation light 3 is coupled to the mode propagating in the longitudinal direction of the optical fiber 2 and propagates through the core region 11.

In the operation described above, as the excitation light 3 is introduced efficiently into the core region 11, the excitation light 3 is absorbed sufficiently even if the initial injection of the excitation light 3 is provided at the sidewall of the optical fiber.

As well understood from the above description, in the optical fiber laser 1 according to the present invention, as the excitation light 3 from the excitation light source 7 can be introduced and absorbed efficiently in the core region 11, it will be appreciated that the high-power laser oscillation can be established and that a lower-cost semiconductor laser in comparison with the conventional one can be used as the excitation light source 7, and thus, the overall optical fiber laser 1 can be made at low cost.

As the optical fiber laser 1 according to the present invention is configured so that the excitation light 3 is introduced at the surface of the prism 6, a bar-structured or stack-structured semiconductor laser can be applied to the excitation light source 7. Therefore, it will be appreciated that the number of the excitation light sources 7 can be increased and that the overall power of the excitation light can be increased easily and at low cost.

As the power density of the excitation light 3 is not concentrated at localized positions in the optical fiber laser 1 according to the present invention, it will be appreciated that the optical fiber 2 may not be damaged and higher reliability can be established.

As the flat surface 5 is formed by processing the outer circumferential area of the wrapped optical fiber 2 in the optical fiber laser 1 according to the present invention, it will be appreciated that the mechanical strength of the optical fiber 2 may not be reduced so much and higher reliability can be established.

The excitation light 3 introduced by the sidewall excitation (as shown in FIG. 1B) is reflected and propagated between the outer surface of the base member 4 and the metal film 15 repetitively, and also is coupled to the propagation wave mode developed in the core region 11 and the inner cladding region 12 and propagates in their longitudinal direction. Another fiber gratings 18 and 19, which are used for reflecting the light having the wavelength of 976 nm equivalent to the wavelength of the excitation light, are preferably formed outside the fiber gratings 16 and 17. Another optical fiber formed with the fiber gratings 16 and 18 or the fiber gratins 17 and 19 may be wrapped at the base member 4 together with the optical fiber 2, which can reduce the overall size of the optical fiber laser 1.

Though the above described embodiment uses a double-clad type optical fiber doped with Yb for the optical fiber 2 and the laser oscillation at the wavelength band of 1080 nm can be established, it will be appreciated that the same effect provided by the present invention can be obtained alternatively by using another rare earth element, such as Nd, Er and Th. For example, a laser oscillation for the wavelength band of 1060 nm can be established by doping Nd, and a laser oscillation for the wavelength band of 1530 nm can be established by doping Er. In those cases, Bragg wavelength for the fiber gratings 16 and 17 is adjusted to be equivalent to the wavelength for the respective laser oscillation wavelength, and Bragg wavelength for the fiber grating 18 is adjusted to be equivalent to the wavelength for the respective excitation light wavelength.

Though the outer surface of the base member 4 is formed in a smooth flat and curve surface in the embodiment shown in FIG. 1, this is an illustrative example and do not limit the embodiment. In the embodiment shown in FIG. 2A, the groove 21 for supporting the optical fiber 2 is formed at the outer circumferential area of the base member 4. The groove 21 can preferably support the optical fiber 2 if the groove 21 is formed so that its cross-section may be shaped in a semicircle having about the same diameter as the diameter of the optical fiber 2. The inner surface of the groove 21 may be preferably formed as a mirror surface. The cross-section shape of the groove 21 is not limited to the semicircle but is allowed to be V-shaped which is suitable for easier mechanical processing or parabolic-shaped which can focus the parallel lights efficiently, each of which can support the optical fiber 2 definitely.

Figure 2A:
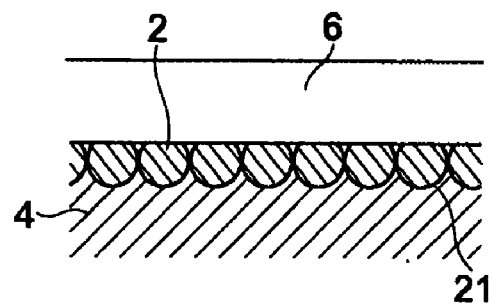
FIG. 2A is a magnified partial picture of the cross section view of the base member projected onto the plane parallel to the primary axis of the base member in another embodiment of the present invention.
Figure 2B:
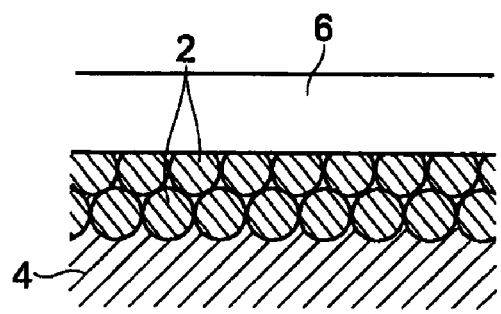
FIG. 2B is a magnified and partial picture of the cross section view of the base member projected onto the plane parallel to the primary axis of the base member in another embodiment of the present invention.

In the embodiments shown in FIG. 1 and FIG. 2A, the optical fiber 2 is wrapped around the base member 4 in a single layer. As described before, the optical fiber 2 may be wrapped in multilayer structure. In the multilayer structure shown in FIG. 2B, the outer circumferential area of the optical fiber 2 at the outermost layer may be flatten mechanically and the prism 6 can be contacted to the finished flat surface. Owing to the multilayer structure of the optical fiber 2, it will be appreciated that the excitation light 3 ejected from the prism 6 is injected to the optical fiber 2 at the outermost layer as well as the optical fiber at the lower layer, and hence, the excitation light 3 can be absorbed more efficiently.

Though only a single prism 6 is used in the above embodiment, it is allowed that plural prisms 6 are arranged and plural excitation light sources 7 corresponding to the individual prisms 6 may be provided. Owing to this arrangement, it will be appreciated that more amounts of excitation lights 3 can be introduced into the core region 11.

Figure 3:
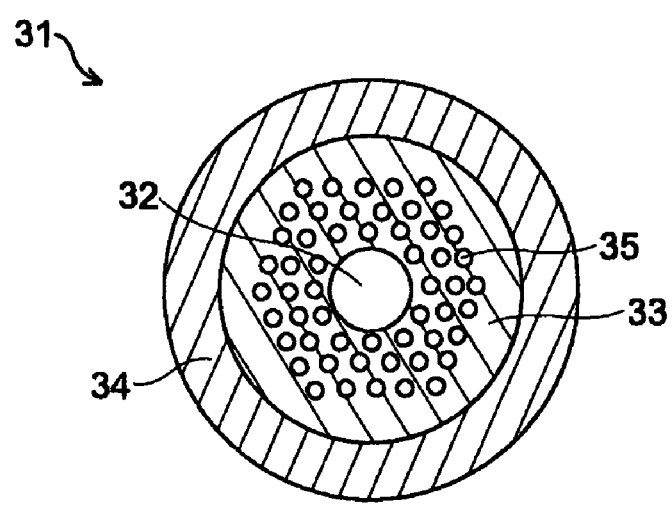
FIG. 3 is a cross section view of the photonic band gap fiber used in another embodiment of the present invention.

Though a double-clad type optical fiber is used as the optical fiber 2 in the above embodiment, another type of optical fiber can realize the present invention. The photonic band gap fiber 31 shown in FIG. 3 comprises the hollow core region 32 and the inner and outer cladding regions 33 and 34 coaxially arranged outside the hollow core region 32, in which plural holes 35 are formed at the inner cladding region 33 for forming a photonic band gap in the wavelength band of the excitation light, and rare earth elements are doped in the solid part of the inner cladding region 33, and the refractive index of the outer cladding region 34 is determined to be lower than that of the inner cladding region 33.

The photonic band gap fiber 31 so configured as described above is used as the optical fiber 2 in the optical fiber laser 1 shown in FIG. 1. In this case, the flat surface 5 is also formed so as to reach the inner cladding region 33. The operation of the excitation light 3 introduced through the prism 6 into the optical fiber 2 is the same as described in the above embodiment, in which the excitation light 3 is absorbed by the rare earth elements as propagating in the inner cladding region 33. The laser oscillation light is enclosed inside the hollow core region 32 by the photonic band gap structure.

As the hollow core region 32 of this photonic band gap fiber 31 is hollow, it will be appreciated that its core may not be damaged even by applying a laser oscillation light with very high power density. Thus, this photonic band gap fiber 31 is suitable for the optical fiber laser in the high-power oscillation applications.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments, which can be embodied within a scope encompassed and equivalent thereof with respect to the feature set out in the appended claims.

What is claimed is:

1. An optical fiber laser for oscillating a laser light by introducing an excitation light for exciting a rare earth element, comprising:

an optical fiber doped partially by the rare earth element and wrapped around a base member, the base member having an outer surface that includes a flat surface portion and a curved surface portion, one part of an outer circumferential area of said wrapped optical fiber being processed in order to form a flat surface over the flat surface portion of the base member, wherein the flat surface of the optical fiber and the flat surface portion of the base member are arranged in parallel to each other, and wherein the base member has an oval tubular shape and an oval cross section, and a mirror surface is formed at an outer circumferential area of the base member; and a prism, whose one face is made contacted to the flat surface of the outer circumferential area of the optical fiber, wherein one face of the prism is contacted to one face of the flat surface, leaving an exposed flat surface of the wrapped optical fiber, the exposed flat surface not contacting the prism, wherein a metal film for reflecting the excitation light is coated in contact with the prism and in contact with the exposed flat surface not contacting the prism, and wherein the excitation light is introduced into said optical fiber through a surface of said prism other than said one face of said prism.

2. The optical fiber laser according to claim 1, wherein the optical fiber is composed of a solid core region, inner and outer cladding regions concentric to the solid core region, the rare earth element is doped to the solid core region, a refractive index of the inner cladding region is made smaller than a refractive index of the solid core region and larger than a refractive index of the outer cladding region, and the flat surface is formed so as to reach the inner cladding region.

3. The optical fiber laser according to claim 1, wherein the optical fiber is composed of a hollow core region, inner and outer cladding regions concentric to the hollow core region, plural holes are formed in the inner cladding region in order to form a photonic band gap in an oscillation light wavelength band, the rare earth element is doped to the solid part of the inner cladding region, a refractive index of the outer cladding region is made smaller than a refractive index of the solid part of the inner cladding region, and the flat surface is formed so as to reach the inner cladding region.

4. The optical fiber laser according to claim 1, wherein a groove for supporting the optical fiber is formed at an outer circumferential area of the base member.

5. The optical fiber laser according to claim 1, wherein the wrapped optical fiber is fixed by transparent adhesive material having a refractive index smaller than a refractive index of the outer cladding region.

6. The optical fiber laser according to claim 1, wherein the excitation light source is configured in a bar structure in which a light emitting device part is arranged in a linear array or configured in a stack structure in which linear arrays are piled.

7. The optical fiber laser according to claim 1, wherein the flat surface portion of the outer surface of the base member is a smooth, flat surface.

8. The optical fiber laser according to claim 1, wherein the excitation light is introduced respectively into a couple of surfaces of the prism, in which those surfaces do not contact to the flat surface of the outer circumferential area of the optical fiber.

9. The optical fiber laser according to claim 1, wherein the flat surface of the wrapped optical fiber is formed by molding or machining.

10. An optical fiber laser for oscillating a laser light by introducing an excitation light for exciting a rare earth element, comprising:
   an optical fiber doped partially by the rare earth element and wrapped around a base member, the base member having an outer surface that includes a flat surface portion and a curved surface portion, one part of an outer circumferential area of said wrapped optical fiber being processed in order to form a flat surface over the flat surface portion of the base member,
   wherein the flat surface of the optical fiber and the flat surface portion of the base member are arranged in parallel to each other, and
   wherein the base member has an oval tubular shape and an oval cross section, and a mirror surface is formed at an outer circumferential area of the base member; and
   a prism, whose one face is made contacted to the flat surface of the outer circumferential area of the wrapped optical fiber,
   wherein one face of the prism is contacted to one face of the flat surface, leaving an exposed flat surface of the wrapped optical fiber, the exposed flat surface not contacting the prism,
   wherein a metal film for reflecting the excitation light is coated in contact with the prism and in contact with the exposed flat surface not contacting the prism,
   wherein the excitation light is introduced into said optical fiber through a surface of said prism other than said one face of said prism, and
   wherein the optical fiber is composed of a solid core region, inner and outer cladding regions concentric to the solid core region, the rare earth element is doped to the solid core region, and the flat surface is formed so as to reach the inner cladding region.

11. The optical fiber laser according to claim 10, wherein a groove for supporting the optical fiber is formed at an outer circumferential area of the base member.

12. The optical fiber laser according to claim 10, wherein the wrapped optical fiber is fixed by transparent adhesive material having a refractive index smaller than a refractive index of the outer cladding region.

13. An optical fiber laser for oscillating a laser light by introducing an excitation light for exciting a rare earth element, comprising:
   an optical fiber doped partially by the rare earth element and wrapped around a base member, the base member having an outer surface that includes a flat surface portion and a curved surface portion, one part of an outer circumferential area of said wrapped optical fiber being processed in order to form a flat surface over the flat surface portion of the base member,
   wherein the flat surface of the optical fiber and the flat surface portion of the base member are arranged in parallel to each other, and
   wherein the base member has an oval tubular shape and an oval cross section, and a mirror surface is formed at an outer circumferential area of the base member; and
   a prism, whose one face is made contacted to the flat surface of the outer circumferential area of the wrapped optical fiber,
   wherein one face of the prism is contacted to one face of the flat surface, leaving an exposed flat surface of the wrapped optical fiber, the exposed flat surface not contacting the prism,
   wherein a metal film for reflecting the excitation light is coated in contact with the prism and in contact with the exposed flat surface not contacting the prism,
   wherein the excitation light is introduced into said optical fiber through a surface of said prism other than said one face of said prism, and
   wherein the optical fiber is composed of a hollow core region, inner and outer cladding regions concentric to the hollow core region, plural holes are formed in the inner cladding region in order to form a photonic band gap in an oscillation light wavelength band, the rare earth element is doped to the solid part of the inner cladding region, and a refractive index of the outer cladding region is made smaller than a refractive index of the solid part of the inner cladding region.

14. The optical fiber laser according to claim 13, wherein a groove for supporting the optical fiber is formed at an outer circumferential area of the base member.

15. The optical fiber laser according to claim 13, wherein the wrapped optical fiber is fixed by transparent adhesive material having a refractive index smaller than a refractive index of the outer cladding region.

* * * * *